United States Patent [19]

Imazeki et al.

[11] 4,396,973
[45] Aug. 2, 1983

[54] PROGRAMMABLE SEQUENCE CONTROLLER

[75] Inventors: Ryoji Imazeki, Hachioji; Katsuaki Kusumi, Kawasaki; Yoshihiro Nakajima, Hino, all of Japan

[73] Assignee: Fujitsu Fanuc Ltd., Tokyo, Japan

[21] Appl. No.: 225,697

[22] Filed: Jan. 16, 1981

[30] Foreign Application Priority Data

Feb. 1, 1980 [JP] Japan .................................. 55-11108

[51] Int. Cl.³ ....................... G05B 19/18; G06F 15/46
[52] U.S. Cl. .................................... 364/136; 364/167; 364/474
[58] Field of Search ............... 364/136, 140, 141, 146, 364/147, 167–171, 474, 475, 200 MS File, 900 MS File

[56] References Cited

U.S. PATENT DOCUMENTS 4,149,235 4/1979 Froyd et al. .................... 364/136 X

OTHER PUBLICATIONS

Jeffery, "Retrofitting with CNC"–Proceedings of the Annual Meeting and Technical Conference of the Numerical Control Society–Chicago, Ill.–Apr. 9–12, 1978, Proc. 15–pp. 194–206.

Primary Examiner—Joseph F. Ruggiero
Attorney, Agent, or Firm—Staas & Halsey

[57] ABSTRACT

A programmable sequence controller which need not be equipped with a tape reader for reading a paper tape bearing a punched sequence program or the like. A prepared sequence program or the like is punched in a paper tape in accordance with the standards of a paper tape reader which is provided in a numerical control device, and then is transferred from the numerical control device to a random access memory in the programmable sequence controller. The sequence program is read from the random access memory to permit the execution of sequential operations by processing the program.

3 Claims, 6 Drawing Figures

Fig. 5

| Command Code | Operand |
|---|---|
| ⋮ | ⋮ |
| RD | MF |
| AND·NOT | M28 |
| AND·NOT | M24 |
| AND·NOT | M22 |
| AND·NOT | M21 |
| AND·NOT | M18 |
| AND·NOT | M14 |
| AND | M12 |
| AND | M11 |
| WRT | M03 |
| ⋮ | ⋮ |
| RD | AUT |
| AND | M03 |
| AND·NOT | SPCCW |
| WRT | SPCCW |
| ⋮ | ⋮ |
| RD | HS.M |
| OR | J.M |
| OR | MAN |
| AND | READY |
| AND·NOT | CRH |
| WRT | CRA |
| ⋮ | ⋮ |

① brackets rows RD MF through WRT M03
② brackets rows RD AUT through WRT SPCCW

PROGRAMMABLE SEQUENCE CONTROLLER

CROSS REFERENCE TO RELATED APPLICATIONS

This application is related to our copending U.S. Application Ser. No. 224,025 entitled "Programmable Sequence Controller".

BACKGROUND OF THE INVENTION

This invention relates to a programmable sequence controller, and more particularly to a programmable sequence controller from which it is possible to omit a tape reader for reading a paper tape into which a sequence program or the like has been punched.

Numerical control systems permit various mechanical elements in machine tools, robots and other devices to be controlled on the basis of instructions from a numerical control device which incorporates an operation panel. It is necessary in such numerical control systems to provide circuitry between the numerical control device (referred to as an NC hereinafter) and the machine in order to transmit the NC commands to each of the mechanical elements. This is conventionally accomplished by the provision of heavy current circuitry comprising a multiplicity of relay groups, the relays being actuated in accordance with the NC commands such as M-function instructions, S-function instructions and commands from the operation panel. The conventional arrangement, however, incorporates a numerical control system which is large in size, and necessitates a large number of relays in order to handle more complicated operations. Higher cost and a decline in reliability are the result.

A proposed system for improving upon the foregoing arrangement employs a programmable sequence controller to perform the function of the relays. With a programmable sequence controller the processing of signals between the NC and the machine is accomplished by way of the program, so that the problems of system size and operation complexity can be solved without a major increase in cost. Nevertheless, some increase in the cost and size of the system cannot be avoided with the conventional programmable sequence controller since the controller must be provided with its own program input means such as a tape reader.

SUMMARY OF THE INVENTION

Accordingly, an object of the present invention is to provide a programmable sequence controller which is compact, reliable and low in cost.

To this end, the tape reader provided in the numerical control device is utilized also by the programmable sequence controller, so that the controller need not be provided with separate program input means.

Other features and advantages of the invention will be apparent from the following description taken in conjunction with the accompanying drawings.

BRIEF DESCRIPTION OF THE DRAWINGS

FIG. 5 is an example of a sequence program in which the sequence functions of the controller in FIG. 3 are programmed utilizing operation codes and operands.

DESCRIPTION OF THE PREFERRED EMBODIMENT

Figure 1:
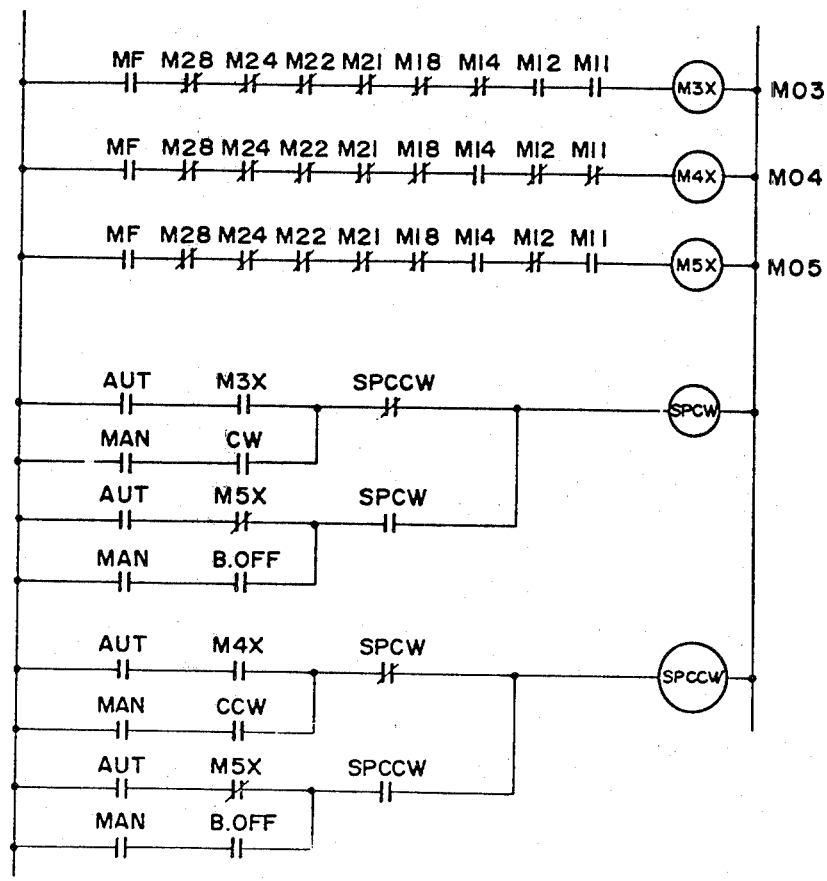
FIG. 1 is a ladder diagram which is useful in describing forward rotation, reverse rotation and stopping operations of a spindle representing one example of a mechanical element whose operation is controlled by commands from a numerical control device.

FIG. 1 shows a ladder diagram consisting of relay contacts which are in the normally open or normally closed state, the contacts belonging to relays which have the illustrated reference characters, but which are not shown. Relay contacts in the normally closed state are accompanied by a slash mark, whereas relay contacts in the normally open state have no slash. A relay MF is actuated when an M-function (miscellaneous function) instruction is read from an NC tape or the like. M11 through M28 denote relays for M-code signals, of which the relays M11, M12, along with the relay MF, are actuated in response to an M03 command from the NC. M3X is a relay actuated by a forward spindle rotation command M03 or the like, and M4X is a relay actuated by a reverse spindle rotation M04 or the like. M5X is a relay actuated by a spindle stop command M05 or the like. Relays AUT, MAN are actuated when an operation panel enters automatic mode and manual mode commands, respectively. SPCW and SPCCW denote relays which deliver forward spindle rotation and reverse spindle rotation outputs to the machine side, respectively.

As one example, assume that the NC issues the forward rotation command M03 in the automatic mode (relay AUT actuated). In response thereto, relays MF, M11 and M12 are actuated (but not relays M14, M18, . . . ,M28), and relay M3X is actuated. As a result, relay SPCW will be actuated if the spindle is not rotating in the reverse direction (relay SPCCW deactuated), and the forward spindle rotation command will be delivered to the machine side. Now, if a manual/automatic changeover switch on the operation panel is switched over to the manual side to establish the manual mode (relay MAN actuated), and if a forward/reverse/stop changeover switch on the operation panel is switched over to the forward position (relay CW actuated), then relay SPCW will be actuated and the forward spindle rotation command will be delivered to the machine side.

Figure 2:
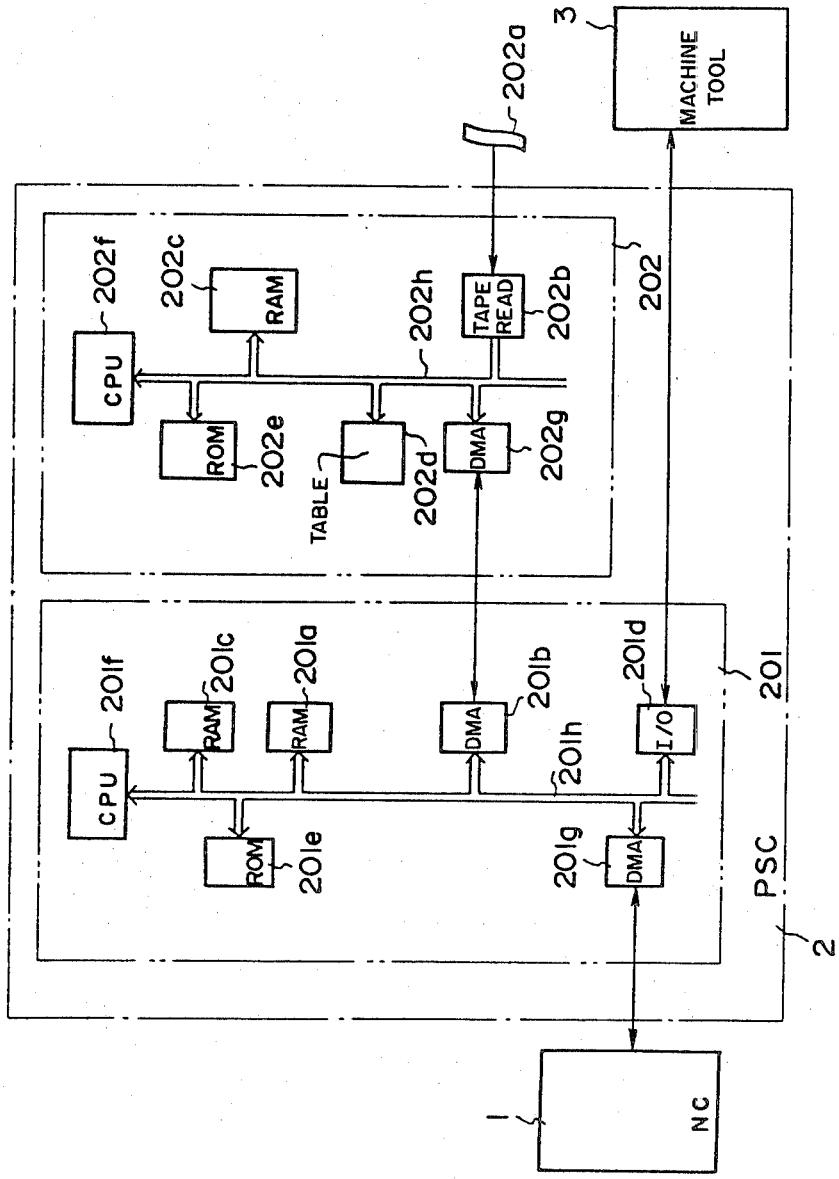
FIG. 2 is a block diagram of a programmable sequence controller.
Figure 3:
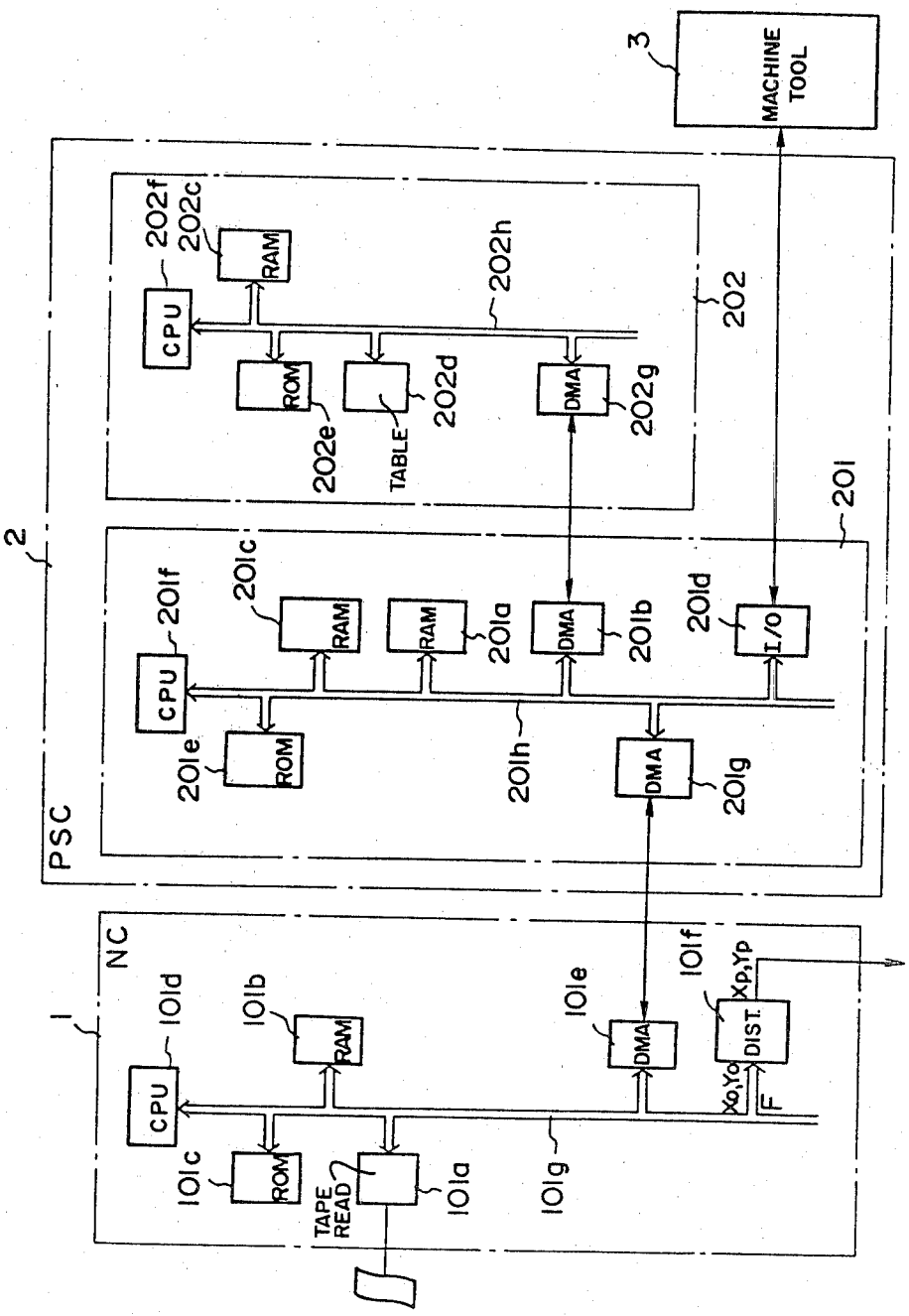
FIG. 3 is a block diagram of a preferred embodiment of a programmable sequence controller of the present invention.

A programmable sequence controller (referred to as a PSC hereinafter) 2 illustrated in FIGS. 2 and 3 is programmed to perform the functions described above. The PSC 2 is installed between an NC 1 and a machine tool 3, and includes a sequence controller 201 and a programmer 202 which is adapted to convert an input sequence program into machine language and to revise a sequence program. The NC 1 includes a paper tape reader 101a for reading a machining tape, a sequence program tape and the like. The programmed machining instructions punched in the tape are stored in a RAM 101b. A ROM 101c is provided in the NC to store the control program which controls the NC. A central processing unit (CPU) 101d performs processes in accordance with instructions from the program of machining instructions or from the control program. A sending and receiving unit 101e, such as a direct memory access controller, is provided in the NC 1 for the purpose of exchanging data with the sequence controller 201. A pulse distributing arithmetic circuit 101f receives signals indicative of amounts of movement $X_o$, $Y_o$ in the direction of X- and Y-axes and a signal indicative of a feed rate F, and executes a well-known pulse distributing operation to deliver distribution pulses $X_p$, $Y_p$. Signals travel to or from these units in the NC 1 along a bus line 101g.

The programmer 202 in the PSC 2 includes a paper tape reader 202b for reading a sequence program which has been punched in a paper 202a. Also provided is a random access memory (RAM) 202c for storing the sequence program. A table 202d stores the corresponding relationship between symbols MF, AUT, . . . , which are the operands of the sequence program, and storage locations in a data memory 201a, which is provided in the sequence controller 201. A read-only memory (ROM) 202e is provided to store a control program for controlling the entire programmer 202, and a language translator program for translating the sequence program, entered from a paper tape, into machine language. A central processing unit (CPU) 202f executes sequence program translation and revision processes and the like in accordance with the program stored in the ROM 202e. A sending and receiving unit 202g, including a buffer or the like, executes an exchange of data with the sequence controller 201. Signals travel to or from these units in the programmer 202 along a bus line 202h.

Thus, in accordance with a feature of the invention, the paper tape reader 202b shown in FIG. 2 is deleted from the programmer 202 of the present invention as illustrated in FIG. 3, thereby providing a reduction in the size of the system. Therefore, in order to store the sequence program in the RAM 202 of the arrangement in FIG. 3, the programmer 202 makes use of the tape reader 101a provided in the NC 1, as will be described in further detail below.

Figures 4, 6:
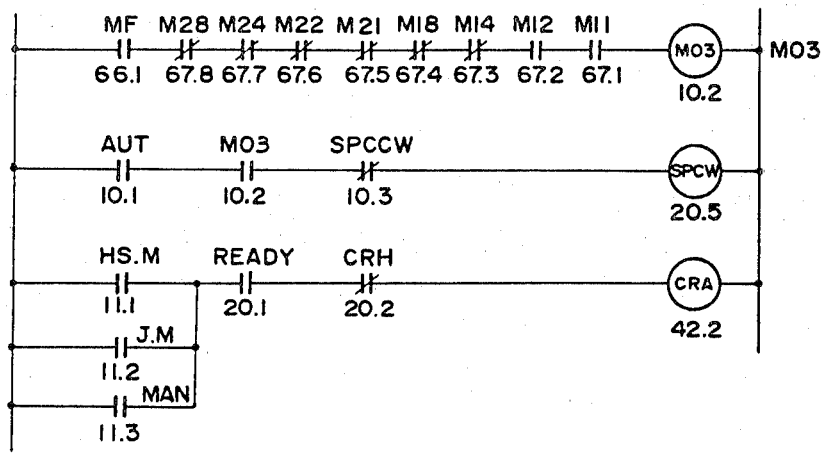
FIG. 4 is an example of a ladder diagram of a sequence circuit.
FIG. 6 is an example of a table for storing the corresponding relationship between symbols, employed as operands, and locations in the data memory.

The sequence controller 201 in the PSC 2 includes a data memory 201a for establishing correspondence between each of the relays in FIG. 1 or in FIG. 4 and a single bit, and for storing the actuated/deactuated states of the relays in the forms of "1"/"0" representation, respectively. For example, when the automatic mode is instructed by the operation panel, the relay AUT is actuated in the case of the heavy current circuitry, whereas a "1" is stored in the first bit at the address 10 in the data memory 201a in the case of the sequence controller. A sending and receiving unit 201b, including a buffer or the like, supervises the exchange of data with the programmer 202. A data input/output unit 201d is provided to supervise the input and output of data between the sequence controller 201 and the machine tool 3. A ROM 201e stores the control program which controls the sequence controller 201. A central processing unit 201f performs predetermined sequence processes in accordance with the control program and sequence program. A direct memory access controller (DMA) 201g is provided in the sequence controller 201 for the purpose of exchanging data with the NC 1. Signals travel to or from these units in the sequence controller 201 along a bus line 201h.

The PSC 2 operates in the following manner. First, a table showing the correspondence between symbols and storage locations is prepared while referring to a ladder diagram. The symbols and storage locations are written in the ladder diagram as shown in FIG. 4, and the table shown in FIG. 6 is prepared. The table shows that the symbol AUT corresponds to the first bit at the address 10 of the data memory 201a, that the symbol M11 corresponds to the first bit at the address 67 of the data memory, and so on. Next, the sequence program is prepared. The sequence program is obtained by programming the functions shown in FIG. 1 logically in terms of operation codes and operands. For example, the ladder diagram shown in FIG. 4 is programmed as illustrated in FIG. 5. The operation codes in the sequence program are a read instruction RD, a logical multiplication operation instruction AND, a write instruction WRT, a logical addition operation instruction OR, and an instruction AND.NOT for logical multiplication with a negative value. MF, M28, . . . , AUT, M03, . . . denote operands which correspond to predetermined addresses and predetermined bits in the data memory 201a provided in the sequence controller 201. The logical operation MF.$\overline{M28}$.$\overline{M24}$.$\overline{M22}$.$\overline{M21}$.$\overline{M18}$.$\overline{M14}$.M12.M11 is executed in accordance with the group of instructions ①in the sequence program, the result of the operation (i.e., "1" or "0") being stored in the data memory 201a at a predetermined bit located at a predetermined address corresponding to the operand M03. The operation AUT.M03.SPCCW is executed in accordance with the group of instructions ②, the result being stored in the data memory 201a at a predetermined bit located at a predetermined address specified by the operand SPCCW.

The correspondence table and sequence program, which have been prepared as described, are then punched in a paper tape, and the paper tape is read by the paper tape reader 202b or 101a, the correspondence table thereby being stored in the table 202d, and the sequence program in the RAM 202c. The previously proposed PSC 2 shown in FIG. 2 is provided with its own paper tape reader 202b, so that the above data is stored directly in the table 202d and RAM 202c through the bus line 202h. In accordance with the present invention, however, the PSC 2 employs the paper tape reader 101a in the NC 1. Accordingly, the data from the correspondence table is stored temporarily and in sequence in the buffer of the sending and receiving unit 101e through the bus line 101g in accordance with the control program of the NC 1, and is then transferred to and stored in the table 202d of the programmer 202 through the sending and receiving units 201g; 201b of the sequence controller 201 and the sending and receiving unit 202g of the programmer 202. The sequence program is stored in the RAM 202c of the programmer in the same fashion. The paper tape should be prepared in accordance with the standards for the NC 1, such as the standards determined by the EIA. When the correspondence table and sequence program have been stored, the execution of the language processor program which has been stored in the ROM 202e starts, and each of the instructions in the sequence program is read out sequentially from the RAM 202c, and the operation codes and operands are converted into machine language. The machine language into which the operands are converted represents the predetermined addresses and bits in the data memory 201a. The sequence program converted into machine language is transferred to and stored in the RAM 201c through the sending and receiving unit 202g in the programmer 202 and the sending and receiving units 201b in the sequence controller 201.

Next, when the status of the changeover switches on the operation panel is set in the data memory 201a, the PSC 2 can begin to execute sequence processing. Hence, in accordance with the control program, the CPU 201f executes sequence processing by reading out each instruction in the sequence program from the RAM 201c sequentially one instruction at a time from the initial instruction to the final instruction of the sequence program. When the processing of the final instruction has been completed, operation returns to the initial instruction of the sequence program, after which the processing of the sequence program instructions is repeated in a cyclic manner.

When the NC 1 issues a command such as the forward spindle rotation command M03 a "1" is stored in those bits of the data memory 201a that are to store the M-function and M-code signals M11 and M12, that is, in the first bit of the address 66 and the first and second bits and so on of the address 67, as will be understood from FIG. 6.

Since the CPU 201f is executing sequence processing by cyclically repeating the read-out of the instructions in the sequence program as described above, a "1" is stored in the fifth bit located at the address 20 of the data memory 201a when the groups of instructions of the sequence program have been executed. Thereafter, when the content (SPCW="1") of the fifth bit at the address 20 is sent from the data input/output unit 201d to the machine tool 3, the spindle of the machine tool will be rotated in the forward direction.

It should be noted that the programmer 202 may be detached from the sequence controller 201 once the sequence program has been transferred to the RAM 201c.

The programmable sequence controller in accordance with the present invention employs the tape reader provided in the numerical control device and therefore need not be provided with its own tape reader. This allows the programmable sequence controller to be greatly reduced in size and cost without sacrificing any of the program-related functions possessed by the previously proposed programmable sequence controller.

Although the present invention has been described in its preferred form with a certain degree of particularity, it is obvious that many modifications and variations are possible in the light of the above teachings. It is therefore to be understood that within the scope of the appended claims, the invention may be practiced otherwise than as specifically described.

What we claim is:

1. A numerical control system, comprising:
   a numerical control device, including:
      a first memory for storing first signals which control the operation of said numerical control device;
      a first data sending and receiving unit, operatively connected to said first memory, for transferring therethrough second signals; and
      a paper tape reader, operatively connected to said first memory and to said first data sending and receiving unit, for reading a paper tape having the first and second signals stored thereon and for transferring the first signals to said first memory and the second signals to said first data sending and receiving unit; and
   a programmable sequence controller, operatively connected to said numerical control device, including:
      a sequence controller, operatively connected to said numerical control device, including:
         a second data sending and receiving unit, operatively connected to said first data sending and receiving unit, for transferring therethrough the second signals; and
         a third data sending and receiving unit, operatively connected to said second data sending and receiving unit, for transferring therethrough the second signals; and
      a programmer, operatively connected to said sequence controller, including:
         a fourth data sending and receiving unit, operatively connected to said third data sending and receiving unit, for transferring therethrough the second signals; and
         a second memory, operatively connected to said fourth data sending and receiving unit, for storing the second signals;
   so that the second signals can be read by said paper tape reader in said numerical control device and transferred to said programmer.

2. A numerical control system according to claim 1, wherein said second signals represent a sequence program and the sequence program is prepared to conform to the standards of said paper tape reader and is punched in the paper tape.

3. A numerical control system according to claim 1, wherein said first, second, third and fourth data sending receiving units comprise first, second, third and fourth direct memory access controllers, respectively.

* * * * *

UNITED STATES PATENT AND TRADEMARK OFFICE
CERTIFICATE OF CORRECTION

PATENT NO. : 4,396,973            Page 1 of 2

DATED : August 2, 1983

INVENTOR(S) : Ryoji Imazeki et al

It is certified that error appears in the above-identified patent and that said Letters Patent is hereby corrected as shown below:

Front page, [30] Foreign Application Priority Data, "55-11108" should be --55-11109--;

[56] References Cited, add the following:

```
--4,034,354  7/1977  Simmons................364/900;
  4,038,533  7/1977  Dummermuth et al.......364/136X;
  4,064,395  7/1977  Schubeler et al........364/136;
  4,068,297  1/1978  Komiya.................364/136;
  4,199,814  4/1980  Rapp et al.............364/900X;
  4,209,847  1/1980  Noda et al.............364/900;
  4,212,081  7/1980  Suzuki et al...........364/900--.
```

Column 2, line 3, "." should be --;--.

Column 3, line 43, after "establishing", insert --a--.

UNITED STATES PATENT AND TRADEMARK OFFICE
CERTIFICATE OF CORRECTION

PATENT NO. : 4,396,973   Page 2 of 2
DATED : August 2, 1983
INVENTOR(S) : Ryoji Imazeki et al It is certified that error appears in the above-identified patent and that said Letters Patent is hereby corrected as shown below:

Column 4, line 21, "MF.$\overline{M28}$.$\overline{M24}$." should be --MF•$\overline{M28}$•$\overline{M24}$•--;

line 22, "$\overline{M22}$.$\overline{M21}$.$\overline{M18}$.$\overline{M14}$.M12.M11" should be --$\overline{M22}$•$\overline{M21}$•$\overline{M18}$•$\overline{M14}$•M12•M11--;

line 28, "AUT.M03.$\overline{SPCCW}$" should be --AUT•M03•$\overline{SPCCW}$--;

line 50, "201$\underline{g}$;" should be --201 and--.

Column 5, line 18, delete "are";

delete "to".

Signed and Sealed this

Fourth Day of December 1984

[SEAL]

Attest:

GERALD J. MOSSINGHOFF

Attesting Officer   Commissioner of Patents and Trademarks